US008533056B2

(12) United States Patent
Schory et al.

(10) Patent No.: US 8,533,056 B2
(45) Date of Patent: Sep. 10, 2013

(54) CUSTOMIZING AN ONLINE SHOPPING EXPERIENCE FOR A USER

(75) Inventors: Guy Schory, San Francisco, CA (US); Stephen Richard Thomas, Los Altos Hills, CA (US); Stephen Kenneth Lobo, Redwood City, CA (US); Frank Russo, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/210,867

(22) Filed: Aug. 16, 2011

(65) Prior Publication Data

US 2012/0072314 A1 Mar. 22, 2012

Related U.S. Application Data

(60) Provisional application No. 61/374,195, filed on Aug. 16, 2010.

(51) Int. Cl.
*G06Q 30/00* (2012.01)

(52) U.S. Cl.
USPC .......................................................... 705/26.1

(58) Field of Classification Search
USPC .......................................................... 705/26.1
See application file for complete search history.

(56) References Cited

U.S. PATENT DOCUMENTS

2009/0076914 A1* 3/2009 Coueignoux ................... 705/14
2011/0270672 A1* 11/2011 Hillard et al. ............. 705/14.42
2013/0066709 A1* 3/2013 Riley ........................ 705/14.42

* cited by examiner

*Primary Examiner* — Mila Airapetian
(74) *Attorney, Agent, or Firm* — Schwegman Lundberg & Woessner, P.A.

(57) ABSTRACT

A method for customizing an online shopping experience for a user is disclosed. The method includes receiving at a marketplace system a request from a user system to transmit instructions for a rendering by the user system of a predetermined user interface relating to a product, using a processor to select one of a plurality of other user interfaces relating to the product, and transmitting to the user system instructions for the rendering by the user system of the one of the plurality of other user interfaces.

20 Claims, 6 Drawing Sheets

CUSTOMIZING AN ONLINE SHOPPING EXPERIENCE FOR A USER

CROSS-REFERENCE TO RELATED APPLICATIONS

This application claims the benefit of U.S. Provisional Application No. 61/374,195, filed Aug. 16, 2010, entitled "CUSTOMIZING AN ONLINE SHOPPING EXPERIENCE FOR A USER," which is incorporated herein by reference in its entirety.

TECHNICAL FIELD

The present application relates generally to the technical field of online marketing, and, in one specific example, to customizing an online shopping experience for a user based on information about the user.

BACKGROUND

When a user accesses a web site via a network and clicks on an online advertisement associated with, for example, a particular set of keywords the user entered into a search box, the clicking of the online advertisement may direct the user to a separate web site related to the subject of the advertisement (e.g., a product) without taking into consideration information about the user (e.g., the Internet or geographic location of the user or a behavior of the user with respect to a web site hosting the particular web page) or a likelihood that the web site presented to the user (as opposed to other web sites) would induce the user to conclude a transaction related to the subject of the advertisement. The end result is the user is less likely to conclude a transaction related to the subject of the advertisement than if the user had been directed to a customized shopping experience (e.g., a web site) that was selected from a group of customized shopping experiences and tailored as much as possible to the user (e.g., based on a profile of the user with respect to the web site or based on success rates of each of the group of customized shopping experiences in inducing other users to conclude other transactions related to the subject of the advertisement).

BRIEF DESCRIPTION OF THE DRAWINGS

Some embodiments are illustrated by way of example and not limitation in the figures of the accompanying drawings in which.

DETAILED DESCRIPTION

In the following description, for purposes of explanation, numerous specific details are set forth in order to provide an understanding of various embodiments of the inventive subject matter. It will be evident, however, to those skilled in the art that embodiments may be practiced without these specific details. Further, well-known instruction instances, protocols, structures, and techniques have not been shown in detail. As used herein, the term "or" is to be construed in an inclusive or exclusive sense. The term "product" herein refers to a good or a service of which one or more specimens are listed by a network-based publication system (e.g., as being available for purchase). Examples of products include a specific brand of shaver having a specific model number, a specific brand of gaming console having a specific color, or a specific brand of digital recorder having a specific storage capacity. Other examples of products include downloadable data (e.g., video, music, or an electronic book), an authorization to use downloadable data (e.g., a license), and an obligation to perform a service (e.g., technology consulting or an astrology reading).

As used herein, the term "item" is to be construed as a specimen of a product. Examples of items include a particular shaver, a particular gaming console, or a particular digital recorder. Other examples of items include a particular copy of downloadable data (e.g., a video file, a music file, or electronic book file), a particular authorization allowing a particular person to use downloadable data, and a particular obligation to perform a service for a particular person. The phrase "marketplace system" is to be construed as an electronic commerce system (e.g., EBAY®, AMAZON®, or CRAIGSLIST®).

A method for customizing an online shopping experience for a user is disclosed. The method may include receiving at a marketplace system a request from a user system to transmit instructions for a rendering by the user system of a predetermined user interface relating to a product; using a processor to select one of a plurality of other user interfaces relating to the product, a rendering of the one of the plurality of other user interfaces by the user system having a first probability of increasing revenues of a marketplace system, a rendering of the predetermined user interface by the user system having a second probability of increasing the revenues of the marketplace system, the selecting based on a determination that the first probability is greater than the second probability, the revenues of the marketplace system based on sales of specimens of the product; and transmitting to the user system instructions for the rendering by the user system of the one of the plurality of other user interfaces.

A system for customizing an online shopping experience for a user is disclosed. The system may include a processor; a reception module to receive at a marketplace system a request from a user system to transmit instructions for a rendering by the user system of a predetermined user interface relating to a product; a selection module to select one of a plurality of other user interfaces relating to the product; a rendering of the one of the plurality of other user interfaces by the user system having a first probability of increasing revenues of a marketplace system, a rendering of the predetermined user interface by the user system having a second probability of increasing the revenues of the marketplace system, the selecting based on a determination that the first probability is greater than the second probability, the revenues of the marketplace system based on sales of specimens of the product; and a transmission module to transmit to the user system instructions for the rendering by the user system of the one of the plurality of other user interfaces.

Disclosed is a machine-readable storage medium comprising instructions that, when executed by one or more processors of a machine, causes the machine to perform a method. The method may include receiving at a marketplace system a request from a user system to transmit instructions for a rendering by the user system of a predetermined user interface relating to a product; using a processor to select one of a plurality of other user interfaces relating to the product, a rendering of the one of the plurality of other user interfaces by the user system having a first probability of increasing revenues of a marketplace system, a rendering of the predetermined user interface by the user system having a second probability of increasing the revenues of the marketplace system, the selecting based on a determination that the first probability is greater than the second probability, the revenues of the marketplace system based on sales of specimens of the product; and transmitting to the user system instructions for the rendering by the user system of the one of the plurality of other user interfaces.

Figure 1:
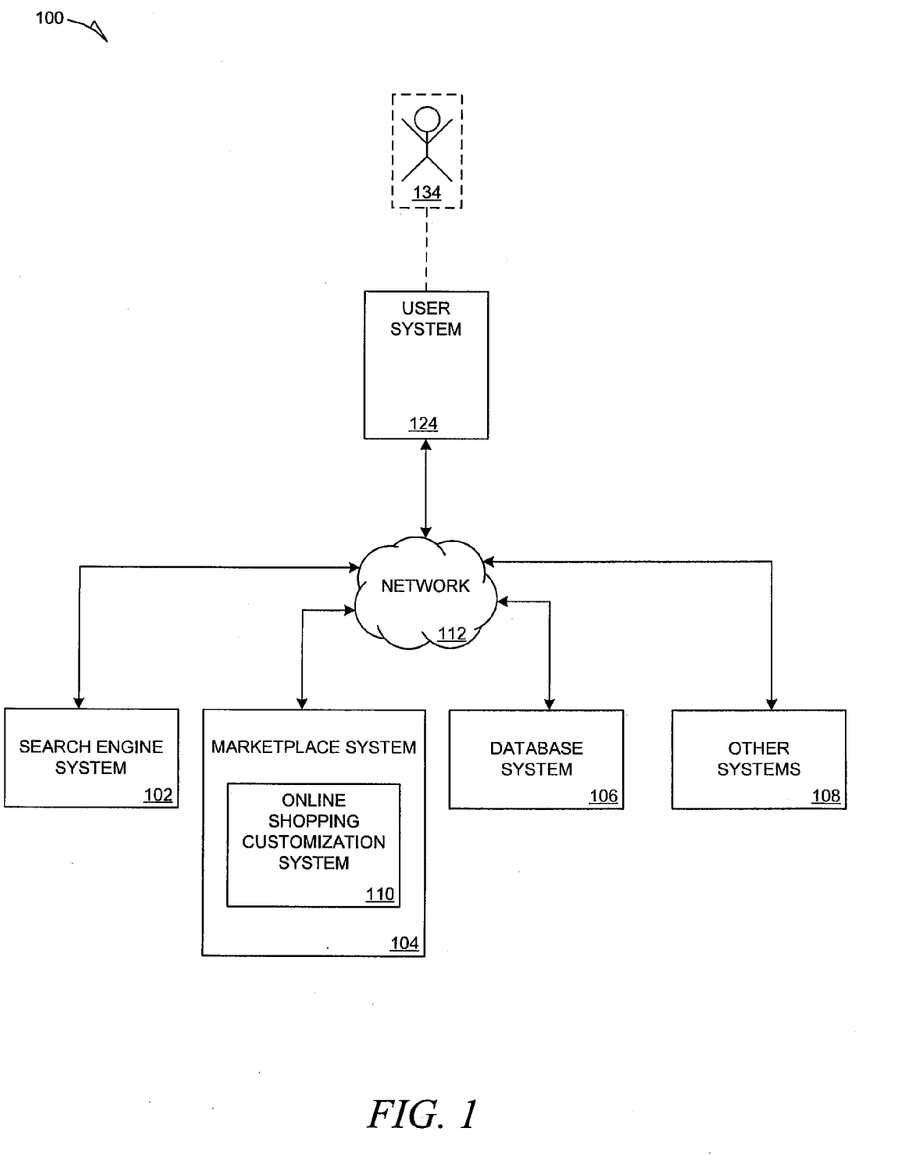
FIG. 1 is a block diagram illustrating an example environment in which a system to customize an online shopping experience for a user may be executing.

FIG. 1 is a block diagram illustrating an example environment 100 in which a system to customize an online shopping experience for a user (e.g., online shopping customization system 110) may be executing. The environment 100 may include a search engine system 102, a marketplace system 104, a database system 106, other systems 108, a network 112, a user system 124, or a user 134. The user 134 may be a user of any of the systems 102, 104, 106, 108, or 124. The online shopping customization system 110 may be included in the marketplace system 104.

An entity associated with the marketplace system 104 may establish advertising contracts with entities associated with the search engine system 102 or entities associated with the other systems 108. For example, the owner of the marketplace system 104 may establish an advertising contract with the owner of the search engine system 102 for the search engine system 102 to present an advertisement in the form of a listing (e.g., a paid search result) that the search engine system 102 includes in a search results listing when the users use the search engine system 102 to perform a search that includes particular keywords (e.g., keywords associated with a particular product). As another example, the owner of the marketplace system 104 may establish an advertising contract with an owner of a comparison-shopping system of the other systems 108 for the comparison-shopping system to integrate an advertisement into a user interface associated with the comparison-shopping system when the users browse the comparison-shopping system for a particular product.

The user 134 may access the search engine system 102, the marketplace system 104, the database system 106, or the other systems 108 via the user system 124 or the network 112. For example, the user may access a system (e.g., the search engine system 102) using a web browser application (e.g., Windows® Internet Explorer®) executing on a personal computer. In response, the user may be presented with the advertisement. The advertisement may relate to a product having specimens for sale on the marketplace system 104. The advertisement may be served by the marketplace system 104. The advertisement may be provided to the systems 102, 106, or 108 by the marketplace system 104 for serving by the systems 102, 106, or 108, respectively. The advertisement may be paid for by the entity associated with the marketplace system 104. The user 134 may express an interest in the subject of the advertisement by performing an action with respect to the advertisement. For example, the user 134 may click on the advertisement. It will be apparent to those of ordinary skill in the art in view of this disclosure that the user 134 may use other means for performing an action with respect to the advertisement.

The user 134 action of clicking on the advertisement may cause the user 134 to become connected to the marketplace system 104. For example, the clicking may cause a web browser application executing on the user system 124 to access (e.g., in the current window, a new window, or a new tab of the current window) a predetermined landing page of a web site associated with the marketplace system 104. The marketplace system may intercept the accessing of the predetermined landing page to redirect the user to a customized landing page (e.g., via the online shopping customization system 110). The customized landing page may be selected from a group of landing pages based on information about the user (e.g., information about the user maintained by the search engine system 102, the marketplace system 104, or the other systems 108). The information about the user may be contained in database system 106. The information about the user may be contained in other databases (not shown). The customized landing page may be selected from the group of landing pages based on success rates (or conversion rates) of each of the group of landing pages in inducing other users to complete other transactions (e.g., transactions related to the product). Thus, the marketplace system may not only provide the user with a customized online shopping experience, thus potentially increasing a satisfaction of the user with the marketplace system 104, but also have a greater likelihood of inducing the user 134 to complete a transaction, thus potentially increasing revenues for the marketplace system 104 (e.g., via a collection of transaction fees related to the sale of a specimen of the product).

Figure 2:
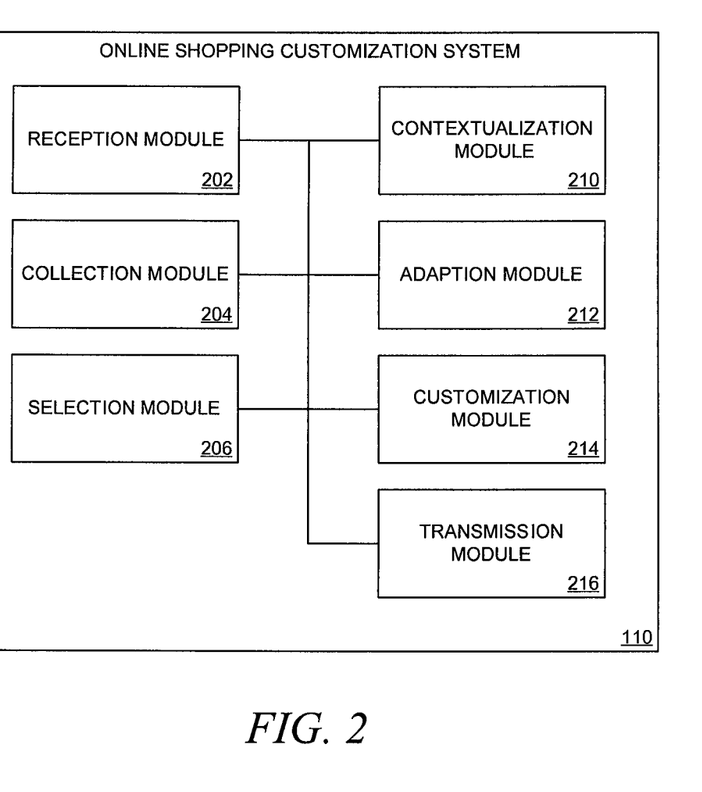
FIG. 2 is a block diagram illustrating an example embodiment of the online shopping customization system of FIG. 1.

FIG. 2 is a block diagram illustrating an example embodiment of the online shopping customization system 110 of FIG. 1. The online shopping customization system 110 may include a reception module 202, a collection module 204, a selection module 206, a contextualization module 210, an adaption module 212, a customization module 214, or a transmission module 216.

The reception module 202 may detect or receive a notification of the interaction by the user 134 with the advertisement. For example, the reception module 202 may detect that an application executing on the user system 124 has requested that the marketplace system transmit instructions to the application related to a rendering of a particular user interface on the user system 124. The particular user interface may be a user interface that was predetermined to be presented to users when they click on the advertisement. The particular user interface may be a landing page of a web site associated with the marketplace system. The reception module 202 may identify an association between the advertisement and an advertising campaign. The reception module 202 may identify one or more sets of attributes, sets of rules, or sets of marketing segments associated with the advertisement or the advertising campaign.

The reception module 202 may identify the user 134. For example, the reception module may identify the user based on a globally unique identifier (GUID) associated with the user. The GUID may be based on an identifier of a user system (e.g., the user system 124) via which the user clicked on the advertisement. The GUID may be shared by the network destinations. For example, the GUID may allow the information that is known by the marketplace system 104 about the user 134 to be correlated with information that is known by the search engine system 102 about the user 134. The reception module 202 may look up information about the user 134 that corresponds to the one or more sets of attributes associated with the advertisement or the advertising campaign. For example, the reception module 202 may look up an age or sex of the user. Additionally, the reception module 202 may look up a specific number of recent activities of the user 134, such as the last keywords/queries used, the last contributors viewed, the last categories accessed, the last aspects viewed, the last items watched, the last items viewed, the last products watched, the last products viewed, the last sellers viewed, and so on. The reception module 202 may perform the looking up of the information about the user 134 using an application program interface (API) associated with the collection module 204 (e.g., a user profiling interface). The reception module 202 may provide the result of the looking up of the information about the user 134 to the selection module 206.

The collection module 204 may retrieve information about the user 134. The information about the user may be maintained by any of the systems 102, 104, or 108. The information about the user may be stored in the database system 106 or other databases. For example, the collection module 204 may retrieve the values corresponding to the one or more sets of attributes associated with the advertisement or the advertising campaign. The retrieving of a value of an attribute for a user may be performed in response to a calling of the API of the collection module 204 (e.g., the user profiling interface) by another module (e.g., the reception module 202). The value of the attribute may be provided to the other module in response to the calling of the API or the retrieving of the value of the attribute. The collection module 204 may support a querying of values associated with accesses by the user 134 of multiple sites (or domains). In other words, the values may be an aggregation of values from multiple domains. For example, the values associated with a cross-domain query for the last 10 products watched by the user 134 may be an aggregation of values associated with accesses by the user 134 of a first domain in the United States and accesses by the user 134 of a second domain in the United Kingdom. The values may be specific to a single site. For example, the values associated with a single-domain query for the last 6 items watched by the user 134 may include values associated with accesses by the user 134 of the first domain only or the second domain only.

Additionally, the values may be specific to a scope of access of the user 134 with respect to the single site or the multiple sites. For example, the values may correspond to non-session-specific data (e.g., persistent data), session-specific data, or user-specific data maintained by the user system 124 or the systems 102, 104, 106, or 108. The collection module 204 may apply de-duplication logic to ensure that each attribute is associated with a single value. The collection module 204 may retrieve values related to a specific scope of access based on a likelihood that the values represent activity of a single user or multiple users. For example, if multiple users access a user system, and the GUID associated with the user is based on an identifier of the user system, non-session-specific data may be contaminated with data from multiple users. In this case, the collection module 204 may retrieve values corresponding to user-specific or session-specific data instead of the persistent data. The collection module 204 may aggregate data across multiple systems. For example, if the search engine system 102 and the marketplace system 104 use the same GUID to identify the user, the collection module 204 may correlate user data from the search engine system 102 and data from the marketplace system 104. The correlation of the user data may serve as the basis of aggregating the data across multiple systems.

The selection module 206 may select a user interface from a group of user interfaces for rendering on the client machine. The selected user interface may be different from the user interface requested by the application executing on the user system 124. The selecting of the user interface by the selection module 206 may be in response to a requesting by the user system 124 that the marketplace system transmit instructions for a rendering of a predetermined user interface associated with a product. The selection module 206 may select the selected user interface randomly. The selection module 206 may select the selected user interface based on various factors. For example, the selection module 206 may select the selected user interface based on the selected user interface incorporating elements of a user interface of the system the user 134 was accessing when the user clicked on the advertisement. Thus, if the user 134 clicks on the advertisement while browsing a web page at shopping.com, the selection module 206 may redirect user 134 to a landing page associated with the marketplace system 104 that is similar to (e.g., has a similar look or feel as) the web page at shopping.com.

The selection module 206 may select the user interface based on the information about the user 134. The selection module 206 may receive information about the user 134 from another module. For example, the selection module 206 may receive information about the user 134 from the reception module 202 or the collection module 204. The selection module 206 may retrieve information about the user 134 from the database system 106. The selection module 206 may select the user interface based on a transaction history of the user 134 with respect to the marketplace system 104. For example, if the user 134 has concluded transactions primarily with respect to items having prices fixed by sellers (as opposed to items having prices set in auctions), the selection module 206 may select the user interface based on a determination that the user interface focuses on presenting information about the product in a fixed-price format. Alternatively, if the user 134 has concluded transactions primarily with respect to items having prices set in an auction, the selection module 206 may select the user interface based on a determination that the user interface focuses on presenting information about the product in an auction format.

The selection module 206 may select the user interface based on a probability that the user 134 will conclude a transaction related to the product after being presented with the user interface. The probability may be based on histories of transactions of other users on the marketplace system 104. For example, for each of the user interfaces in the group of user interfaces, the selection module 206 may determine a percentage of other users that concluded a transaction with respect to a product associated with the advertisement after being presented with the user interface. In other words, the selection module 206 may determine a conversion rate for each of the user interfaces in the group of user interfaces. Thus, the selection module 206 may select the user interface based on the user interface having the highest conversion rate of the user interfaces in the group of user interfaces. The selection module 206 may select the user interface based on a determination that a conversion rate for the user interface is not reliable. The reliability of the conversion rate for a user interface may be based on the number of times the user interface has been presented to other users. If this number is less than a threshold number, the conversion rate for the user interface may be considered unreliable. Thus, the selection module 206 may select the user interface to increase a reliability of the conversion rate of the user interface. The selection module 206 may select the user interface based on a correlation between the user interface and various other data, including non-user-specific data (e.g., a date or a time of day).

The contextualization module 210 may identify a user interface context from which the user 134 performed an action that triggered a sending of the request. A user interface context may include an appearance or a behavior associated with a user interface of the search engine system 102 or one of the other systems 108 (e.g., a comparison-shopping system).

A user interface context may include a flow of activities of the user 134 with respect the search engine system 102 or one of the other systems 108.

For example, while comparing prices of specimens of the product via a user interface associated with a comparison-shopping system, the user 134 may click on the advertisement. In this case, the user 134 may be more inclined to buy a particular specimen of the product (e.g., an available specimen having a same price as the particular specimen advertised on the comparison-shopping system) if the selected user interface focuses on a view of an available specimen of the product. In other words, the user 134 may be less likely to purchase the particular specimen of the product if the selected user interface focuses on a search results listing of multiple specimens of the product, each having different prices, because the user has already conducted such a search using the comparison-shopping system. Thus, the user interface context (in this case, the flow of the activities of the user 134) may suggest that the selected user interface include specific user interface elements (e.g., a view of a particular specimen of a product), but not include others (e.g., a search listing of multiple specimens of the product).

As another example, while searching for information about a product via the search-engine system 102, the user may click on the advertisement. In this case, the user may not expect the selected user interface to include a view of a particular specimen of the product. Instead, the user may expect the selected user interface to include a search listing of multiple specimens of the product (e.g., such that the user can compare specimens or prices of specimens view the selected user interface).

As another example, if the user clicks on the advertisement while shopping for specimens of the product via a user interface associated with an online store (e.g., shopping.com), the user may be more inclined to purchase a specimen of the product if the appearance or behavior of the selected user interface matches the appearance or behavior of the user interface of the online store. For example, if the online store supports only a traditional buying format (e.g., a fixed-price format), the user may be more inclined to purchase a specimen of the product if the selected user interface features a fixed price for the specimen. If the user clicks on the advertisement while shopping for specimens of the product via a user interface associated with a classified advertising system, the user may be more inclined to purchase a specimen of the product if the selected user interface features a classified advertisement listing of the specimen. In other cases, a user interface that features an auction pricing format may be most appropriate based on the user interface context.

The adaption module 212 may create a new user interface to include in the group of user interfaces, or modify an existing user interface included in the group of user interfaces, based on a user interface context (e.g., a user interface context identified by the contextualization module 210). For example, the adaption module 212 may create a new user interface for a specimen of a product based on a lack of availability of a user interface in the group of user interfaces that is optimized for the identified user interface context. Alternatively, the adaption module 212 may adapt an existing user interface in the group of user interfaces by, for example, to incorporate an element of an appearance, behavior, or flow of user activities associated with the user context into the existing user interface.

The creating of the new user interface or the modifying of the existing user interface may include selecting at least one user interface element (e.g., a widget) from a group of user interface elements, including user interface elements related to searching for items, displaying search results, refining search results, browsing categories of products, browsing search results, displaying summaries of products, displaying detailed views of specimens of products, displaying information about users (e.g., sellers or buyers), or setting user preferences. The creating or modifying may include determining sizes of user interface elements, locations of user interface elements, or arrangements of user interface elements. The creating or modifying may include incorporating an appearance or behavior into the new user interface or existing user interface, respectively, based on the user interface context. For example, a user interface element related to displaying a detailed view of a specimen of a product may be customized to display by default the price of the specimen of the product in a buying format (e.g., a fixed-pricing, auction-pricing, or classified-ad-pricing buying format) that corresponds to the identified user interface context. As another example, the creating or modifying may include incorporating colors, fonts, icons, or other design elements associated with the identified user interface context.

The customization module 214 may create a new user interface to include in the group of user interfaces, or modify an existing user interface included in the group of user interfaces, based on information about the user (e.g., the information about the user collected by the collection module 204). For example, the customization module 214 may incorporate into the new user interface or the existing user interface elements related to a transaction history of the user or a profile of the user, including an age of the user, a sex of the user, or other user demographics.

The transmission module 216 may transmit instructions to the user system 124 for the rendering of a user interface by the user system 124. The user interface may be the user interface selected by the selection module 206. For example, the transmission module 216 may transmit an HTML document for a web page to the user system 124 for such that a web browser application executing on the user system 124 may render the web page.

Figure 3:
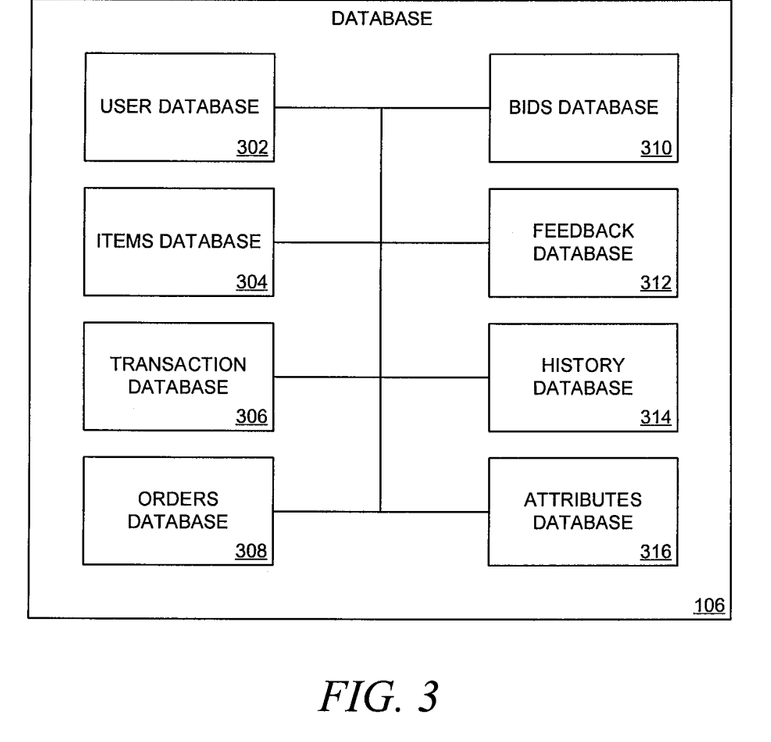
FIG. 3 is a block diagram illustrating an example embodiment of the database of FIG. 1.

FIG. 3 is a block diagram illustrating an example embodiment of the database system 106 of FIG. 1. The database system 106 may include a user database 302, an items database 304, a transaction database 306, an orders database 308, a bids database 310, a feedback database 312, a history database 314 or an attributes database 316. The user database 302 may include a record for each registered user of the marketplace system 104, and may include identifier, address, and financial instrument information pertaining to each such registered user. A user may operate as a seller, a buyer, or both, within the marketplace system 104. In one example embodiment, a buyer may be a user that has accumulated value (e.g., commercial or proprietary currency), and is accordingly able to exchange the accumulated value for items that are offered for sale at the marketplace system 104.

The items database 304 may include item records for goods and services that are available to be, or have been, transacted via the marketplace system 104. A transaction database 306 may include a record for each transaction (e.g., a purchase or sale transaction) pertaining to items for which records exist (e.g., within the items database 304). The orders database 308 may include order records, with each order record being associated with an order. Each order, in turn, may be associated with one or more transactions for which records exist (e.g., within the transaction database 306).

The bids database 310 may include a bid record for each bid received at the marketplace system 104 in connection with an auction-format listing of an item. The feedback database 312 may include records containing reputation information concerning users. The history database 314 may include records pertaining to a history of transactions to which a user has been a party. The attributes database 316 may include records containing attribute information pertaining to items for which records exist (e.g., within the items database 304). Considering only a single example of such an attribute, the attributes databases 316 may indicate a currency attribute associated with an item, with the currency attribute identifying the currency of a price for the relevant item as specified by a seller. Each record within each of the databases may be linked to one or more records within other ones of the database, so as to, for example, associate a seller and one or more actual or potential buyers with an item.

The database system 106 may be maintained or associated with the search engine system 102, the marketplace system 104, or the other systems 108. Additional records may be stored in different databases maintained or associated with ones of the search engine system 102, the marketplace system 104, or the other systems 108. Thus, one of the systems (e.g., the search engine system 102) may maintain different sets of information relating to a potential transaction on the marketplace system 104 (e.g., information about a user or a user interface context) than another one of the systems. Nevertheless, as described above, the collection module 204 may aggregate the different sets of information maintained by each of the systems.

Figure 4:
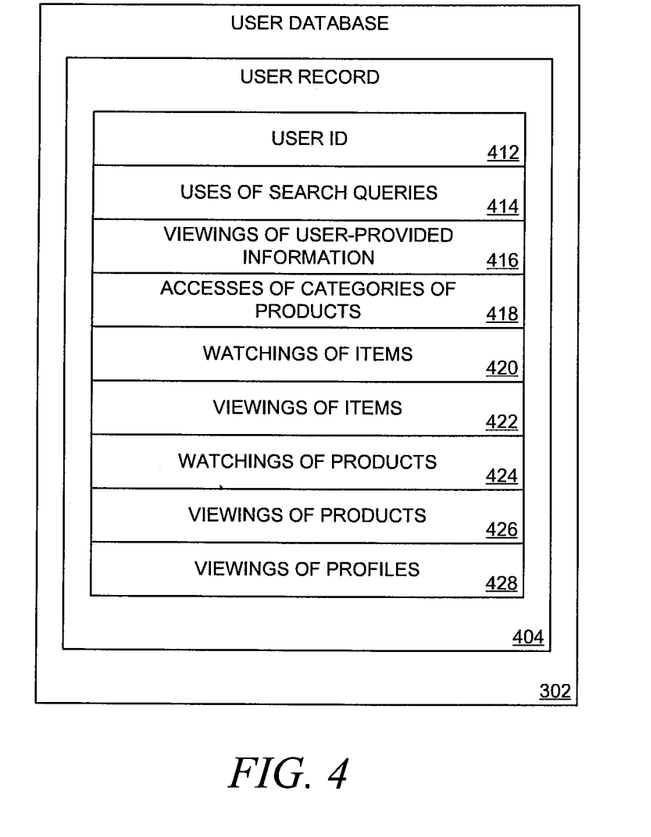
FIG. 4 is a block diagram of an example embodiment of a user record 404 included in the user database of FIG. 3.

FIG. 4 is a block diagram of an example embodiment of a user record 404 included in the user database 302 of FIG. 3. The user record 404 includes a field 412 for a user identifier (e.g., the GUID associated with the user), a field 414 for uses of search queries, a field 416 for viewings of user-provided information, a field 418 for accesses of categories of products, a field 420 for watchings of items, a field 422 for viewings of items, a field 424 for watchings of products, a field 426 for viewings of products, and a field 428 for viewings of profiles. A watching of an item or is a designating of the item or product by a user as an item or product that the user is monitoring. For example, a user is watching an item if the user adds the item to a watch list within the marketplace system 104. A watching of an item may include taking an action with respect to the item (e.g., viewing the current high bid on the item or placing a bid on the item), viewing other items of a seller of the item, or getting notified by email when the status of a listing of the item changes or the item is relisted. Each of the fields may be linked to additional database fields of the user record 404 or a different record (not shown). For example, the field 414 may be linked to additional fields for the sets of keywords used in each of the search queries and a number of times each of the sets of keywords were used. The field 424 may include information regarding each of the products (e.g., the names of the products) that were watched and a number of times each of the products was watched.

Figure 5:
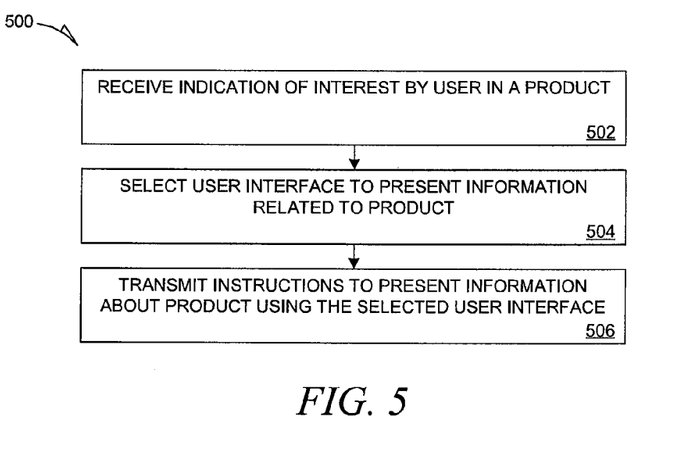
FIG. 5 is an example embodiment of a method for providing a user with a customized online shopping experience.
Figure 6:
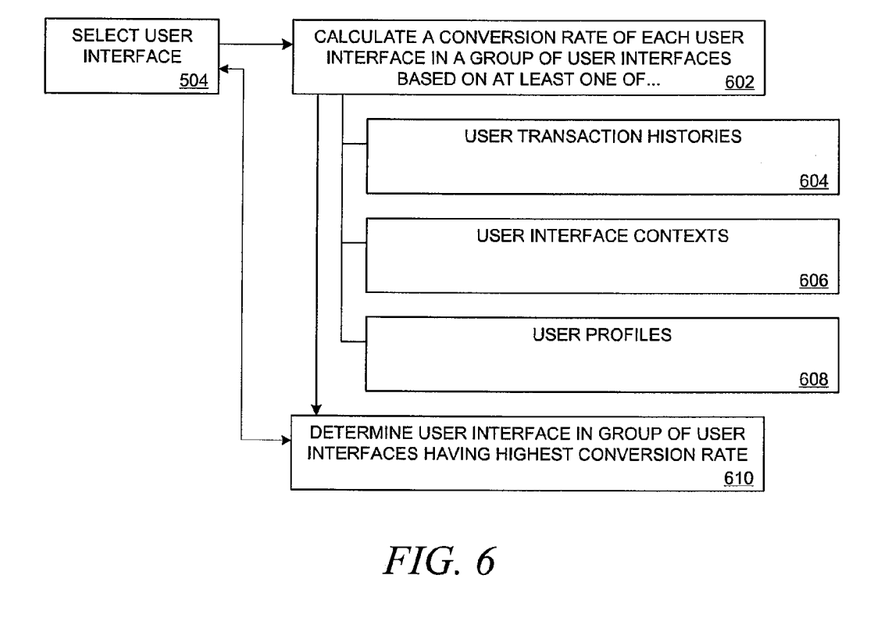
FIG. 6 is an example embodiment of the selecting operation of the method of FIG. 5.

FIG. 5 is an example embodiment of a method 500 for providing a user with a customized online shopping experience. The method 500 may include receiving 502 an indication of an interest by a user in a product. The indication may be in the form of a request from an application (e.g., a web browser application) executing on a user system. The request may be for a marketplace system to transmit instructions to the application for a rendering of a predetermined user interface related to the product. The request may be initiated by a clicking of the user on an advertisement presented to the user in a user interface associated with the search engine system 102 or one of the other systems 108. The method 500 may include selecting 504 a user interface to present information related to the product. The user interface may be selected from a group of user interfaces based on various factors, as illustrated in FIG. 6. The method 500 may include transmitting 506 instructions to present information about the product using the selected user interface. For example, the method 500 may include transmitting instructions to the application to present a user interface related to a specimen of the product that is currently for sale on the marketplace system 104.

FIG. 6 is an example embodiment of the selecting 504 operation of the method 500. The selecting of the user interface 504 may include calculating 602 a conversion rate of each user interface in a group of user interfaces based on at least one of user transaction histories 604, user interface contexts 606, or user profiles 608. For example, the calculation of the conversion rates may be performed by the selection module 206. The selecting of the user interface 504 may include determining 610 a user interface in the group of user interfaces having the highest conversion rate.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access (e.g., the data store). For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 7:
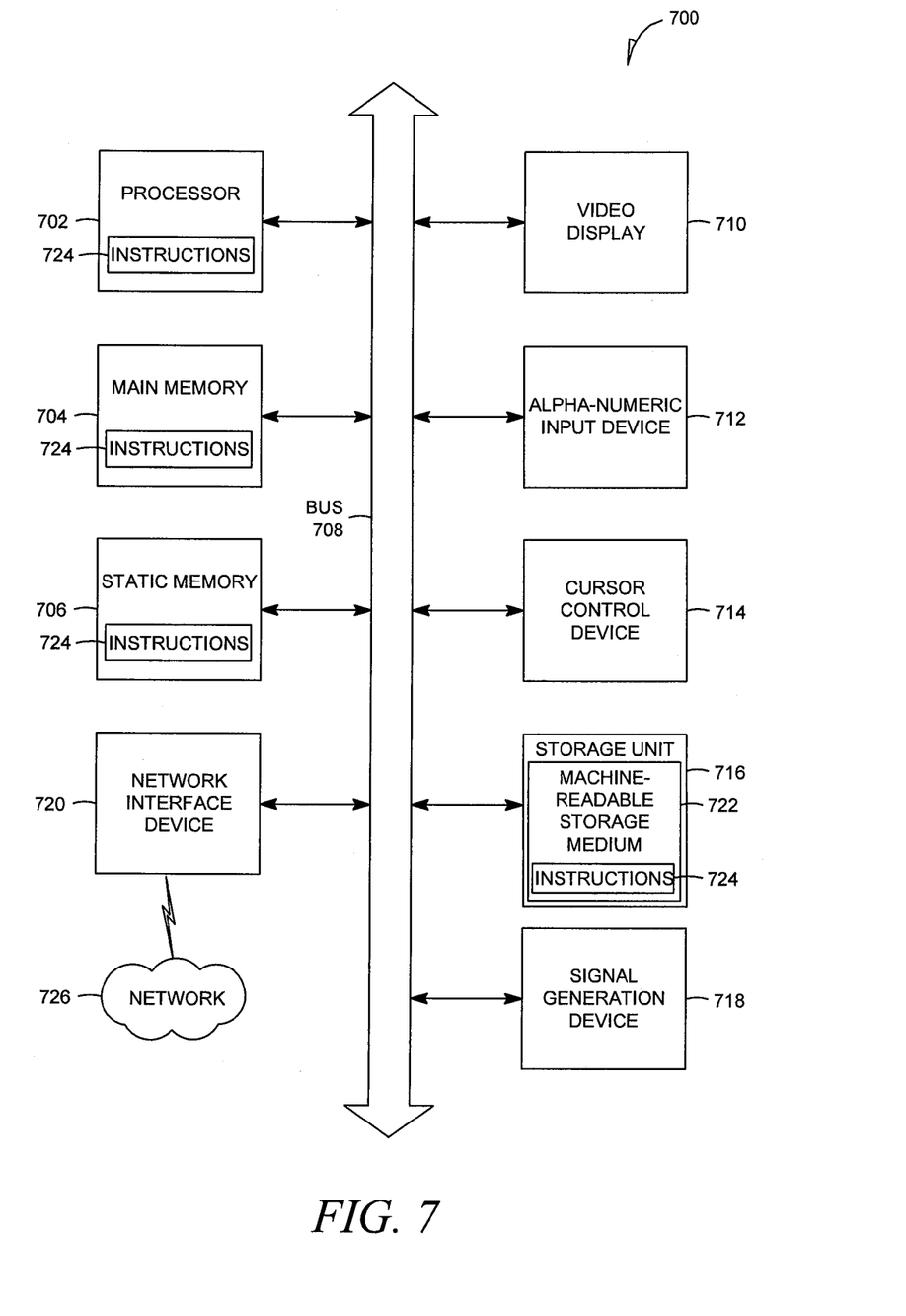
FIG. 7 is a block diagram of an example machine on which components of various embodiments of the system may be executed.

FIG. 7 is a block diagram of machine in the example form of a computer system 700 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a user system in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation (or cursor control) device 714 (e.g., a mouse), a disk drive unit 716, a signal generation device 718 (e.g., a speaker) and a network interface device 720.

Machine-Readable Medium

The disk drive unit 716 includes a machine-readable storage medium 722 on which is stored one or more sets of instructions 724 and data structures (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media. The instructions 724 may also reside, completely or at least partially, within the static memory 706.

While the machine-readable storage medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any non-transitory medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 724 may further be transmitted or received over a communications network 726 using a transmission medium. The instructions 724 may be transmitted using the network interface device 720 and any one of a number of well-known transfer protocols (e.g., Hyper Text Transfer Protocol or HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   receiving at a marketplace system a request from a user system to transmit instructions for a rendering by the user system of a user interface relating to a product;
   using a processor to select the user interface from a plurality of user interfaces relating to the product, the rendering of the user interface by the user system having a first probability of increasing revenues of a marketplace system, a rendering of an additional user interface by the user system having a second probability of increasing the revenues of the marketplace system, the selecting based on a determination that the first probability is greater than the second probability, the revenues of the marketplace system based on sales of specimens of the product, the determination that the first probability is greater than the second probability based on an identification that a buying format associated with the user interface corresponds to a buying format associated with a user interface context from which the request was generated on the user system; and
   transmitting to the user system instructions for the rendering by the user system of the one of the plurality of other user interfaces.

2. The method of claim 1, wherein renderings of other user interfaces of the plurality of other user interfaces have respective other probabilities of increasing revenues of the marketplace system and the selecting is based on a determination that the first probability is greater than each of the other probabilities.

3. The method of claim 1, wherein the first probability is based on a conversion rate of the user interface, the conversion rate reflecting a number of renderings of the user interface in comparison to a number of the sales of the specimens of the product relating to the renderings.

4. The method of claim 1. further comprising:
   identifying the user interface context from which a user performed an action to trigger the request, the user interface context being one of a plurality of user interface contexts, the plurality of user interface contexts including a comparison-shopping context; and
   modifying one of the plurality of user interfaces to include at least one of a plurality of user interface elements based on the identifying of the user interface context, the plurality of user interface elements including a search result listing relating to the product, the at least one of the plurality of user interface elements excluding the search result listing based on the user interface context not being the comparison-shopping context.

5. The method of claim 1, further comprising:
   collecting information about a user of the user system, the information including at least one of a profile of the user and a transaction history of the user, the profile including at least one of an age of the user and a sex of the user, a first portion of the information maintained by the marketplace system and a second portion of the information maintained by a system external to the marketplace system; and
   customizing at least one of an appearance and a behavior of the one of the plurality of user interfaces based on the information.

6. The method of claim 1, wherein the determination that the first probability is greater than the second probability is based on a correlation between characteristics of a user of the user system and a conversion rate of the user interface with respect to other users having the characteristics, the conversion rate reflecting a number of renderings of the user interface in comparison to a number of the sales of the specimens of the product relating to the renderings.

7. The method of claim 5, wherein one of the characteristics of the user is a preference of one of a plurality of buying formats, the plurality of buying formats including auction-based pricing and seller-fixed pricing, the preference determined based on a transaction history of the user with respect to the marketplace system.

8. A system comprising:
a processor:
a reception module to receive at a marketplace system a request from a user system to transmit instructions for a rendering by the user system of a user interface relating to a product;
a selection module to select the user interface from a plurality of user interfaces relating to the product, the rendering of the user interface by the user system having a first probability of increasing revenues of a marketplace system, a rendering of an additional user interface by the user system having a second probability of increasing the revenues of the marketplace system, the selecting based on a determination that the first probability is greater than the second probability, the revenues of the marketplace system based on sales of specimens of the product, the determination that the first probability is greater than the second probability based on an identification that a buying format associated with the user interface corresponds to a buying format associated with a user interface context from which the request was generated on the user system; and
a transmission module to transmit to the user system instructions for the rendering by the user system of the one of the plurality of other user interfaces.

9. The system of claim 8, wherein renderings of other user interfaces of the plurality of other user interfaces have respective other probabilities of increasing revenues of the marketplace system and the selecting is based on a determination that the first probability is greater than each of the other probabilities.

10. The system of claim 8, wherein the first probability is based on a conversion rate of the user interface, the conversion rate reflecting a number of renderings of the user interface in comparison to a number of the sales of the specimens of the product relating to the renderings.

11. The system of claim 8, further comprising;
a contextualization module to identify the user interface context from which a user performed an action to trigger the request, the user interface context being one of a plurality of user interface contexts, the plurality of user interface contexts including a comparison-shopping context and
an adaption module to modify one the plurality of user interfaces to include at least one of as plurality of user interface elements based on the identifying of the user interface context, the plurality of user interface elements including a search result listing relating to the product, the at least one of the plurality of user interface elements excluding the search result listing based on the user interface context not being the comparison-shopping context.

12. The system of claim 8, further comprising:
a collection module to collect information about a user of the user system, the information including at least one of a profile of the user and a transaction history of the user, the profile including at least one of an age of the user and a sex of the user, a first portion of the information maintained by the marketplace system and a second portion of the information maintained by an external system, the external system being external to the marketplace system; and
a customization module to customize at least one of an appearance and a behavior of the one of the plurality of user interfaces based on the information.

13. The system of claim 8, wherein the determination that the first probability is greater than the second probability is based on a correlation between characteristics of a user of the user system and a conversion rate of the user interface with respect to other users having the characteristics, the conversion rate reflecting a number of renderings of the user interface in comparison to a number of the sales of the specimens of the product relating to the renderings.

14. The system of claim 13, wherein one of the characteristics of the user is a preference of one of a plurality of buying formats, the plurality of buying formats including auction-based pricing and seller-fixed pricing, the preference determined based on a transaction history of the user with respect to the marketplace system.

15. A machine-readable storage medium comprising instructions that, when executed by one or more processors of a machine, causes the machine to perform operations comprising:
receiving at a marketplace system a request from a user system to transmit instructions for a rendering by the user system of a user interface relating to a product;
using a processor to select the user interface from a plurality of user interfaces relating to the product, the rendering of the user interface by the user system having a first probability of increasing revenues of a marketplace system, a rendering of an additional user interface by the user system having a second probability of increasing the revenues of the marketplace system, the selecting based on a determination that the first probability is greater than the second probability, the revenues of the marketplace system based on sales of specimens of the product, the determination that the first probability is greater than the second probability based on an identification that a buying, format associated with the user interface corresponds to buying format associated with a user interface context from which the request was generated on the user system; and
transmitting to the user system instructions for the rendering by the user system of the one of the plurality of other user interfaces.

16. The machine-readable storage medium of claim 15, wherein renderings of other user interfaces of the plurality of other user interfaces have respective other probabilities of increasing revenues of the marketplace system and the selecting is based on a determination that the first probability is greater than each of the other probabilities.

17. The machine-readable storage medium of claim 15, wherein the first probability is based on a conversion rate of the other user interface, the conversion rate reflecting a number of renderings of the user interface in comparison to as number of the sales of the specimens of the product relating to the renderings.

18. The machine-readable storage medium of claim 15, the operations further comprising:

identifying the user interface context from which a user performed an action to trigger the request the user interface context being one of a plurality of user interface contexts, the plurality of user interface contexts including a comparison-shopping context; and     modifying one of the plurality of user interfaces to include at least one of a plurality of user interface elements based on the identifying of the user interface context, the plurality of user interface elements including a search result listing relating to the product, the at least one of the plurality of user interface elements excluding the search result listing based on the user interface context not being the comparison-shopping context.

19. The machine-readable storage medium of claim 18, the operations further comprising:

collecting information about a user of the use system, the information including at least one of a profile of the user and a transaction history of the user, the profile including at least one of an age of the user and a sex of the user, a first portion of the information maintained by the marketplace system and a second portion of the information maintained by a system external to the marketplace system; and     customizing at least one of an appearance and a behavior of the one of the plurality of user interfhces based on the information.

20. The method of claim 1, wherein the buying format is one of a plurality of buying format, the plurality of buying formats including a fixed-priced format and an auction-pricing format.

\* \* \* \* \*

UNITED STATES PATENT AND TRADEMARK OFFICE
CERTIFICATE OF CORRECTION

PATENT NO. : 8,533,056 B2  
APPLICATION NO. : 13/210867  
DATED : September 10, 2013  
INVENTOR(S) : Schory et al.

Page 1 of 2

It is certified that error appears in the above-identified patent and that said Letters Patent is hereby corrected as shown below:

In the Claims

In column 14, line 29, in claim 1, delete "one" and insert --user interface--, therefor In column 14, line 29, in claim 1, after "of", delete "other", therefor In column 14, line 42, in claim 4, delete "claim 1." and insert --claim 1,--, therefor In column 15, line 16, in claim 8, delete "processor:" and insert --processor;--, therefor In column 15, line 39, in claim 8, delete "one" and insert --user interface--, therefor In column 15, line 39, in claim 8, after "of", delete "other", therefor In column 15, line 51, in claim 11, delete "comprising;" and insert --comprising:--, therefor In column 15, line 57, in claim 11, delete "context and" and insert --context; and--, therefor In column 15, line 58, in claim 11, after "one", insert --of--, therefor In column 15, line 59, in claim 11, delete "as" and insert --a--, therefor In column 16, line 47, in claim 15, delete "buying," and insert --buying--, therefor In column 16, line 48, in claim 15, after "buying", insert --a--, therefor

In column 16, line 52, in claim 15, delete "one" and insert --user interface--, therefor In column 16, line 52, in claim 15, after "of", delete "other", therefor In column 16, line 62, in claim 17, after "the", delete "other", therefor In column 16, line 63, in claim 17, delete "as", and insert --a--, therefor Signed and Sealed this  
Twenty-third Day of December, 2014

Michelle K. Lee  
*Deputy Director of the United States Patent and Trademark Office*

CERTIFICATE OF CORRECTION (continued)
U.S. Pat. No. 8,533,056 B2

In column 17, line 4, in claim 18, after "request", insert --,--, therefor

In column 17, line 18, in claim 19, delete "use" and insert --user--, therefor

In column 17, line 27, in claim 19, delete "interfhces" and insert --interfaces--, therefor In column 17, line 30, in claim 20, delete "format," and insert --formats,--, therefor